(12) United States Patent
Yun

(10) Patent No.: US 7,895,618 B2
(45) Date of Patent: Feb. 22, 2011

(54) EMERGENCY ALERT MESSAGE DATA STRUCTURE, EMERGENCY ALERT MESSAGE SIGNALING METHOD, AND CABLE BROADCASTING SYSTEM

(75) Inventor: Chang Sik Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 811 days.

(21) Appl. No.: 11/186,789

(22) Filed: Jul. 22, 2005

(65) Prior Publication Data

US 2006/0020964 A1  Jan. 26, 2006

(30) Foreign Application Priority Data

Jul. 23, 2004  (KR) ...................... 10-2004-0057594

(51) Int. Cl.
  *H04N 7/10* (2006.01)
(52) U.S. Cl. .............................. 725/33; 725/34; 725/35
(58) Field of Classification Search .................... 725/33, 725/34, 35
  See application file for complete search history.

(56) References Cited

U.S. PATENT DOCUMENTS

| | | | |
|---|---|---|---|
| 5,146,612 A | 9/1992 | Grosjean et al. | |
| 5,374,961 A | 12/1994 | Jung | |
| 5,701,161 A * | 12/1997 | Williams et al. | 348/468 |
| 6,543,051 B1 * | 4/2003 | Manson et al. | 725/33 |
| 6,725,460 B1 * | 4/2004 | Nishiyama et al. | 725/32 |
| 6,772,433 B1 * | 8/2004 | LaJoie et al. | 725/52 |
| 7,010,801 B1 * | 3/2006 | Jerding et al. | 725/95 |
| 7,308,697 B1 * | 12/2007 | Jerding et al. | 725/34 |
| 2002/0083470 A1 * | 6/2002 | Lu | 725/136 |
| 2003/0093788 A1 * | 5/2003 | Takenaka | 725/33 |
| 2003/0093789 A1 * | 5/2003 | Zimmerman et al. | 725/34 |
| 2005/0229206 A1 * | 10/2005 | Pugel et al. | 725/33 |
| 2006/0048180 A1 * | 3/2006 | Kendall et al. | 725/33 |

FOREIGN PATENT DOCUMENTS

| | | |
|---|---|---|
| CN | 1246236 | 3/2000 |
| EP | 1 237 366 | 9/2002 |

(Continued)

OTHER PUBLICATIONS

"Emergency Alert Message for Cable" American National Standard, Dec. 2002, XP017001104.

(Continued)

*Primary Examiner*—Joseph P Hirl
*Assistant Examiner*—Jivka Rabovianski
(74) *Attorney, Agent, or Firm*—McKenna Long & Aldridge, LLP

(57) ABSTRACT

An emergency alert message data structure, an emergency alert message signaling method, and a cable broadcasting system using the same are disclosed. The data structure includes a scroll rate field representing a scroll rate of an emergency alert text to be scrolled across a portion of a video screen. The emergency alert (EA) signaling method includes the steps of identifying an emergency alert message included in a cable broadcast signal, the emergency alert message including emergency alert text data representing an emergency alert text to be displayed, and a scroll rate field representing a scroll rate of the emergency alert text, and scrolling the emergency alert text across a first portion of a video screen according to the scroll rate indicated in the scroll rate field.

6 Claims, 4 Drawing Sheets

FOREIGN PATENT DOCUMENTS

| | | |
|---|---|---|
| JP | 2003-209761 | 7/2003 |
| KR | 10-0194223 | 2/1999 |
| KR | 2000-0057469 | 9/2000 |
| KR | 2000-0072951 | 12/2000 |

OTHER PUBLICATIONS

"ATSC Standard: Program and System Information Protocol for Terrestrial Broadcast and Cable (Revision B)" Advanced Television System Committee, Doc. A/65B, Mar. 18, 2003, pp. 1-157, XP001202457.

* cited by examiner

FIG. 1

| Syntax | Bits | Description |
|---|---|---|
| alert_message_time_remaining | 8 | uimsbf seconds range 0..120 |
| event_start_time | 32 | uimsbf |
| event_duration | 16 | uimsbf seconds range 15..6000 |
| reserved | 12 | bslbf |
| alert_priority | 4 | uimsbf |
| details_OOB_source_id | 16 | uimsbf |
| reserved | 4 | '1111' |
| details_major_channel_number | 10 | uimsbf |
| reserved | 6 | '111111' |
| details_minor_channel_number | 10 | uimsbf |
| audio_OOB_source_ID | 16 | uimsbf |
| alert_text_length | 16 | uimsbf |
| alert_text_rate | 16 | uimsbf |
| alert_text() | var | Per ATSC A/65-A sec 6.8 |

FIG. 2

| Alert_priority | Meaning | Audio Required |
|---|---|---|
| 0 | Test message: the alert shall be discarded by terminal devices except those designed to acknowledge and process test messages | No |
| 1-2 | [Reserved] | |
| 3 | Low priority: the alert may be disregarded if processing the alert would interrupt viewing of an access-controlled service | No |
| 4-6 | [Reserved] | |
| 7 | Medium priority: the alert may be disregarded if processing the alert would interrupt viewing of a pay-per-view event. | No |
| 8-10 | [Reserved] | |
| 11 | High priority: the alert shall be processed unconditionally, but can involve text-only display if no audio is available. | No |
| 12-14 | [Reserved] | |
| 15 | Maximum priority: the alert shall be processed unconditionally. If audio is available without tuning to the details channel, that audio shall be substituted for program audio for the duration of the alert message. If audio is not available by means other than by tuning to the details channel, the details channel shall be acquired for the duration of the alert message. | Yes |

EMERGENCY ALERT MESSAGE DATA STRUCTURE, EMERGENCY ALERT MESSAGE SIGNALING METHOD, AND CABLE BROADCASTING SYSTEM

This application claims the benefit of Korean Patent Application No. 10-2004-0057594 filed on Jul. 23, 2005, which is hereby incorporated by reference as if fully set forth herein.

BACKGROUND OF THE INVENTION

1. Field of the Invention

The present invention relates to a cable broadcasting system, and more particularly, to an emergency alert message data structure, an emergency alert message signaling method, and a cable broadcasting system.

2. Discussion of the Related Art

Generally, a digital cable set-top box is required for reception of digital cable broadcast. The digital cable set-top box is connected with a cable head-end, which is a kind of broadcasting station transmitting a digital cable program, to receive an audio/video (A/V) broadcasting program and data broadcast from the cable head-end. At this time, the A/V broadcasting program is received by In-Band signaling among cable frequency bands, and the data broadcast is received by Out-Of-Band (OOB) signaling among the frequency bands. In particular, the cable set-top box can perform two-way communication with the head-end by OOB signaling.

Broadcast protocols for transmission of channel and broadcasting program guide information may be, for example, Service Information (SI) protocol, and Program and System Information Protocol (PSIP). For the purpose of securing stability in the cable broadcast, SI is transmitted by OOB signaling, and PSIP information is transmitted by in-band signaling.

Digital cable broadcast receivers may be, for example, an open cable broadcast receiver adopted in America, a DVB-C broadcast receiver adopted in Europe, and an ISDB-C broadcast receiver adopted in Japan.

In the open cable broadcast receiver, a Point Of Deployment (POD) module with a conditional access (CA) system is separated from the body of a digital cable set-top box in order to prevent copying of high value-added broadcast content and to allow a conditional access thereto. It is thus possible to readily replace a security system with another one and retail the broadcast receiver. Therefore, the digital cable broadcast receiver has the advantage of being capable of being supplied at a low price.

The POD module is inserted in a slot of the digital cable set-top box. In this regard, the POD module is often called a cable card. The term 'POD module' and the term 'cable card' will hereinafter be used interchangeably.

Meanwhile, a cable set-top box-embedded cable broadcast receiver (for example, a cable ready digital TV) has been proposed to enable a retail sale that the open cable system pursues.

This cable broadcast receiver contains a cable set-top box so that the user can receive and view all terrestrial analog broadcast, terrestrial digital broadcast, cable analog broadcast and cable digital broadcast without using a separate cable set-top box.

A basic convention is defined in the cable broadcast receiver to properly receive and process an emergency alert message if a transmitter transmits the emergency alert message to warn of a state of emergency.

That is, if a transmitter transmits an emergency alert message at a specific terrestrial frequency or cable frequency, the cable broadcast receiver receives the transmitted emergency alert message. Then, the cable broadcast receiver outputs information regarding a channel change to a specific terrestrial or cable emergency broadcast channel and an emergency alert to the viewer in order to effectively provide the emergency alert information to the viewer. At this time, the emergency alert information can be outputted in the form of text and/or audio. For example, when the emergency alert information is in the form of text, it may be displayed for a predetermined time while being scrolled from the upper right to upper left of the screen.

The scroll rate of emergency alert contents in text form contained in the emergency alert message is determined by the cable broadcast receiver. That is, the cable broadcast receiver scrolls the emergency alert contents at a predetermined fixed scroll rate or a scroll rate calculated with reference to the received emergency alert message.

As described above, conventionally, the scroll rate of the emergency alert contents in text form contained in the emergency alert message is determined by the cable broadcast receiver.

As a result, even though scroll data has the same size and contents, the scroll rate thereof may be different according to receiver manufacturers (for example, LG, SAMSUNG, etc.) and the types of receivers from the same manufacturer because scroll rate is not standardized.

For example, a receiver of a manufacturer A may scroll the emergency alert contents so fast that the viewer may not accurately recognize a state of emergency, and, on the contrary, a receiver of a manufacturer B may scroll the emergency alert contents so slowly that the viewer may feel irritated.

On the other hand, at the time that the emergency alert is released, the cable broadcast receiver must return to the original state prior to the emergency alert. For example, the cable broadcast receiver must restore the current channel from the emergency broadcast channel to the original channel, viewed by the viewer prior to the emergency broadcast channel, if the original channel was compulsorily changed to the emergency broadcast channel.

However, provided that the emergency alert is released under the condition that data to be scrolled remains, the emergency alert contents will be continuously scrolled on the screen in spite of the fact that the emergency alert has been released.

In this case, the viewer has no choice but to continuously view unnecessary information being scrolled under the condition that he/she does not know how long the unnecessary information will be scrolled. As a result, the viewer may feel irritated and inconvenienced.

SUMMARY OF THE INVENTION

Accordingly, the present invention is directed to an emergency alert message data structure, an emergency alert message signaling method, and a cable broadcasting system that substantially obviate one or more problems due to limitations and disadvantages of the related art.

An object of the present invention is to provide an emergency alert message data structure, an emergency alert message signaling method, and a cable broadcasting system using the same, wherein a transmitter determines and transmits a scroll rate and a receiver scrolls emergency alert contents (or text) at the transmitted scroll rate, thereby enabling all receivers to scroll the same emergency alert contents at the same scroll rate.

Another object of the present invention is to provide an emergency alert message signaling method wherein a receiver obtains time information of scroll data from a scroll rate transmitted from a transmitter and displays the obtained time information along with the scroll data, so that the viewer can know the total scroll time or remaining scroll time of emergency alert contents being scrolled.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data structure for an emergency alert message for use by a cable broadcasting system includes a scroll rate field representing a scroll rate of an emergency alert text to be scrolled across a video screen. The data structure may further include emergency alert text data representing the emergency alert text to be scrolled, and an alert text length field defining a total length in bytes of the emergency alert text data.

In another aspect of the present invention, an emergency alert (EA) signaling method for use by a cable broadcasting system includes the steps of identifying an emergency alert message included in a cable broadcast signal, the emergency alert message including emergency alert text data representing an emergency alert text to be displayed, and a scroll rate field representing a scroll rate of the emergency alert text, and scrolling the emergency alert text across a video screen according to the scroll rate indicated in the scroll rate field.

In another aspect of the present invention, a cable broadcasting receiver includes a memory, a signal receiving unit configured to receive a cable broadcast signal including an emergency alert message and to store the emergency alert message in the memory, the stored emergency alert message comprising emergency alert text data representing an emergency alert text to be displayed, and a scroll rate field representing a scroll rate of the emergency alert text, and a controller configured to generate a control signal to scroll the emergency alert text across a video screen according to the scroll rate indicated in the scroll rate field.

In a further aspect of the present invention, a cable broadcasting system includes a transmitter including a scroll rate of an emergency alert text in an emergency alert message for informing a viewer of an occurrence of an emergency state, and transmitting the emergency alert message, and a receiver for receiving the transmitted emergency alert message and scrolling the emergency alert text across a video screen at the scroll rate included in the received emergency alert message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a table illustrating part of a syntax structure of an emergency alert message according to the present invention;

FIG. 2 is a table illustrating contents defined by various values of an alert_priority field in the emergency alert message of FIG. 1 that determine the signaling (or processing) of the emergency alert message;

DETAILED DESCRIPTION OF THE INVENTION

Figure 3:
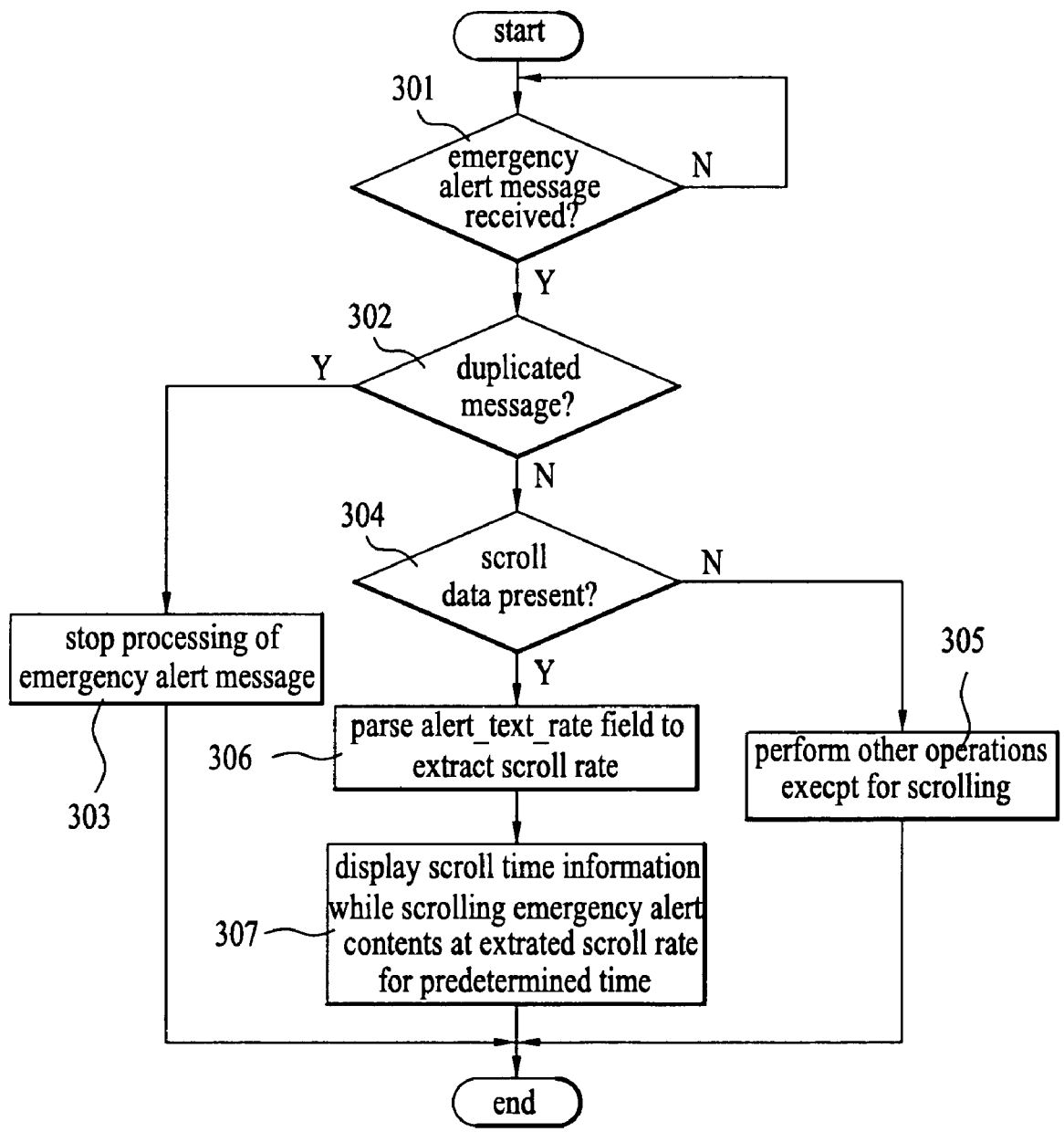
FIG. 3 is a flow chart illustrating an embodiment of an emergency alert message signaling method according to the present invention.

Reference will now be made in detail to the preferred embodiments of the present invention, examples of which are illustrated in the accompanying drawings. Wherever possible, the same reference numbers will be used throughout the drawings to refer to the same or like parts.

In the present invention, a transmitter is adapted to determine and transmit a scroll rate at which emergency alert contents in text form are to be scrolled, and a receiver is adapted to scroll the emergency alert contents at the transmitted scroll rate.

FIG. 1 is a table illustrating part of a syntax structure of an emergency alert message according to the present invention.

The emergency alert message cable_emergency_alert( ) of FIG. 1 is defined in the form of an MPEG-2 table for compatibility with MPEG-2 transport. This table is divided into one or more section units and transmitted in the form of a transport packet. Thus, if the value of a table_ID field of a received MPEG-2 table is 0xD8, a cable broadcast receiver regards the received table as the emergency alert message cable_emergency_alert( ).

An alert_message_time_remaining field in the emergency alert message cable_emergency_alert( ) represents the remaining time of the emergency alert message in a second unit. At this time, the start time of the emergency alert message is defined by a time when the last bit of CRC is received.

An event_start_time field in the emergency alert message represents an actual start time when the cable broadcast receiver alerts the viewer to a state of emergency based on the emergency alert message. An event_duration field in the emergency alert message represents a time when the emergency alert message is stored in a memory.

For example, assume that the alert_message_time_remaining field indicates thirty minutes, the event_start_time field indicates three o'clock, and the event_duration field indicates five o'clock. In this case, the cable broadcast receiver outputs emergency alert contents in the received emergency alert message in the form of text or audio or in the form of a moving image at a changed emergency broadcast channel for thirty minutes starting at three o'clock. The cable broadcast receiver also stores the received emergency alert message until eight o'clock. As a result, the viewer can view the emergency alert contents repeatedly until eight o'clock. However, after eight o'clock, the viewer cannot view the emergency alert contents because the emergency alert contents are deleted from the memory.

An alert_priority field in the emergency alert message represents priority of an emergency alert. The cable broadcast receiver determines the signaling (or processing) of the received emergency alert message on the basis of the value of the alert_priority field. In other words, the cable broadcast receiver determines, on the basis of the alert_priority field value, whether the emergency alert message will be disregarded unconditionally or only in a specific condition, or the receiver will be compulsorily tuned to an emergency broadcast channel, or details channel, contained in the emergency alert message.

A details_OOB_source_ID field in the emergency alert message is valid when the emergency alert message has been transmitted by OOB signaling and a POD module has been inserted, and represents a source ID of a virtual channel for the emergency broadcast channel to which the receiver is to be tuned. The source ID can be known by referring to a virtual channel described in OOB SI.

A details_major_channel_number field and a details_minor_channel_number field in the emergency alert message represent a major channel number and a minor channel number of the emergency broadcast channel to be referred to when the emergency alert message has been transmitted by in-band signaling and the POD module is not inserted, respectively. The major channel number is used as a reference frequency for acquisition of an analog channel or a digital transport stream, and the minor channel number is applied only to a digital channel and is used to identify a service in a multiplexed stream.

An audio_OOB_source_ID field in the emergency alert message is valid when the emergency alert message has been transmitted by OOB signaling and the POD module has been inserted. The audio_OOB_source_ID field represents a source ID of an audio-only virtual channel that provides audio associated with an alert event.

An alert_text_length field in the emergency alert message defines the entire length of an alert_text( ) field subsequent thereto in a byte unit. When the value of the alert_text_length field is 0, it indicates that the alert_text( ) field is not contained in the emergency alert message. The data structure of the alert_text( ) field includes a multiple_string_structure( ) field that represents a textual description of the emergency alert. Preferably, the emergency alert contents in text form acquired by parsing the alert_text( ) field are scrolled from the upper right to upper left of the screen. Alternatively, the emergency alert contents may be scrolled from the upper left to upper right of the screen, or from the upper portion to lower portion of the screen or vice versa. Also, the emergency alert contents may be scrolled at any position of the screen, such as a lower position, left position or right position, as well as the upper position of the screen.

A scroll rate field alert_text_rate in the emergency alert message represents a scroll rate of the scroll data, or emergency alert contents, parsed from the alert_text( ) field. With reference to the size of the scroll data (i.e., the alert_text_length field value) and the emergency alert message duration (i.e., the alert_message_time_remaining field value), the scroll rate is determined as a proper rate at which the viewer can recognize the scroll data best.

In one embodiment of the present invention, the alert_text_rate field is assigned 16 bits, and the scroll rate is represented by an unsigned integer number uimsbf. At this time, a time from the start of the scrolling of the first character of the emergency alert contents until the disappearance of that character from the screen may be described in a second unit. Alternatively, a time from the start of the scrolling of the first character of the emergency alert contents until the end of the scrolling of the last character of the contents may be described in a second unit.

The alert_text_rate field is positioned between the alert_text_length field and the alert_text( ) field in the cable_emergency_alert( ) syntax. Here, the position of the alert_text_rate field is determined by a designer and is recognized by the transmitter and receiver according to a protocol therebetween.

As an alternative, a reserved field in the cable_emergency_alert( ) syntax may be assigned as the alert_text_rate field. For example, a 12-bit reserved field between the event_duration field and the alert_priority field may be assigned as the alert_text_rate field, and the scroll rate may be indicated in this alert_text_rate field. Another reserved field may be used.

FIG. 2 is a table illustrating contents defined by various values of the alert_priority field in the emergency alert message cable_emergency_alert( ) of FIG. 1 that determine the signaling (or processing) of the emergency alert message.

In FIG. 2, in the case where the alert_priority field value is 0, it means that the received emergency alert message is a test message. In this case, the cable broadcast receiver discards the received emergency alert message without signaling (or processing) it.

In the case where the alert_priority field value is 3, the cable broadcast receiver processes the received emergency alert message to provide information regarding an emergency alert to the viewer, only when the current channel is not an access-controlled channel. The access-controlled channel is a channel which can be viewed only when the cable card is inserted. For example, when the current channel, being viewed by the viewer, is a broadcast channel descrambled by the cable card and the alert_priority field value of the received emergency alert message is 3, the emergency alert message is disregarded, not processed.

In the case where the alert_priority field value is 7, the cable broadcast receiver processes the received emergency alert message to provide information regarding an emergency alert to the viewer, only when the current channel is not a pay-per-view channel.

In the case where the alert_priority field value is 11, the cable broadcast receiver unconditionally processes the received emergency alert message to provide information regarding an emergency alert to the viewer. At this time, if audio is not available for the emergency alert, the emergency alert information is provided to the viewer only in the form of text.

In the case where the alert_priority field value is 15, similarly, the cable broadcast receiver unconditionally processes the received emergency alert message to provide information regarding an emergency alert to the viewer. At this time, if necessary, the current channel is compulsorily changed to the emergency broadcast channel. That is, if audio is available for the emergency alert without tuning to the emergency broadcast channel, it may be substituted for audio of the current channel. However, if audio is not available by means other than by tuning to the emergency broadcast channel, the current channel must be unconditionally changed compulsorily to the emergency broadcast channel contained in the received emergency alert message.

FIG. 3 is a flow chart illustrating an embodiment of an emergency alert message signaling method according to the present invention.

First, the cable broadcast receiver determines whether an emergency alert message has been received (Step 301). That is, if the value of a table_ID field parsed from data information is 0xD8, the receiver determines that an emergency alert message has been received, and then processes the received emergency alert message according to the parsed results of respective fields of the table.

In other words, upon determining at step 301 that an emergency alert message has been received, the receiver determines whether the received emergency alert message is a duplicate of a previously received emergency alert message (i.e., an identical message) (Step 302).

If the currently received emergency alert message is determined to be a duplicate of the previously received emergency alert message at step 302, the receiver stops the signaling (or processing) of the currently received emergency alert message (Step 303).

However, in the case where it is determined at step 302 that the currently received emergency alert message is not a duplicate of the previously received emergency alert message, the receiver determines whether scroll data, or emergency alert contents in text form, are present in the received emergency alert message (Step 304). For example, if the value of an alert_text_length field in the received emergency alert message is 0, the receiver determines that no scroll data is present in the message.

If no scroll data is determined to be present in the received emergency alert message at step 304, the receiver performs other operations except for scrolling with respect to the emergency alert message (Step 305). For example, if the value of an alert_priority field in the emergency alert message is 15 and the message has been received by in-band signaling, the receiver extracts an emergency broadcast channel from the message by parsing a major channel number field details_major_channel_number and minor channel number field details_minor_channel_number in the message, and compulsorily changes the current channel to the extracted emergency broadcast channel.

On the other hand, in the case where scroll data is determined to be present in the received emergency alert message at step 304, the receiver parses an alert_text field in the emergency alert message to extract emergency alert contents to be actually scrolled from the message, and parses an alert_text_rate field in the message to extract a scroll rate of the emergency alert contents from the message (Step 306).

Then, the receiver scrolls the extracted emergency alert contents on the screen at the extracted scroll rate for a predetermined time (Step 307). For example, the emergency alert contents may be scrolled from the upper right to upper left of the screen.

As described above, according to the present invention, the receiver does not determine the scroll rate of the emergency alert contents by itself, but scrolls the emergency alert contents at the scroll rate transmitted from the transmitter. Therefore, all receivers can scroll the same emergency alert contents at the same scroll rate.

For example, assume that the number of characters to be scrolled is 100. In this case, conventionally, because the scroll rate is determined by the receiver itself, the scroll rate of the 100 characters may be different according to receiver manufacturers and the types of receivers. Namely, it may take some receivers 10 seconds to scroll all the 100 characters and other receivers 100 seconds.

In contrast, in the present invention, the transmitter includes emergency alert contents to be scrolled in an emergency alert message along with a scroll rate of the emergency alert contents and transmits the resulting emergency alert message, and each receiver scrolls the emergency alert contents included in the transmitted emergency alert message at the scroll rate included in the message. Therefore, all receivers take the same time to scroll all 100 characters.

At this time, on the basis of the scroll rate parsed from the alert_text_rate field and the size of the scroll data (i.e., an alert_text_length field value), the receiver may display a time from the start of the scrolling of the first character of the emergency alert contents until the disappearance of that character from the screen, on a portion of the scroll image of the emergency alert contents. Alternatively, the receiver may calculate a time from the start of the scrolling of the first character of the emergency alert contents until the end of the scrolling of the last character of the contents in a second or minute unit and display the calculated time on a portion of the scroll image of the emergency alert contents.

Also, if the emergency alert contents in the emergency alert message start to be scrolled, the receiver may calculate the remaining time until all the characters of the emergency alert contents are scrolled, in a second or minute unit, and display the calculated remaining time on a portion of the scroll image of the emergency alert contents.

In this manner, according to the present invention, the receiver displays the total and remaining time information of the scroll data together with the scroll data when the emergency alert contents are scrolled. Therefore, the viewer can confirm the total or remaining scroll time of the emergency alert contents.

Figure 4:
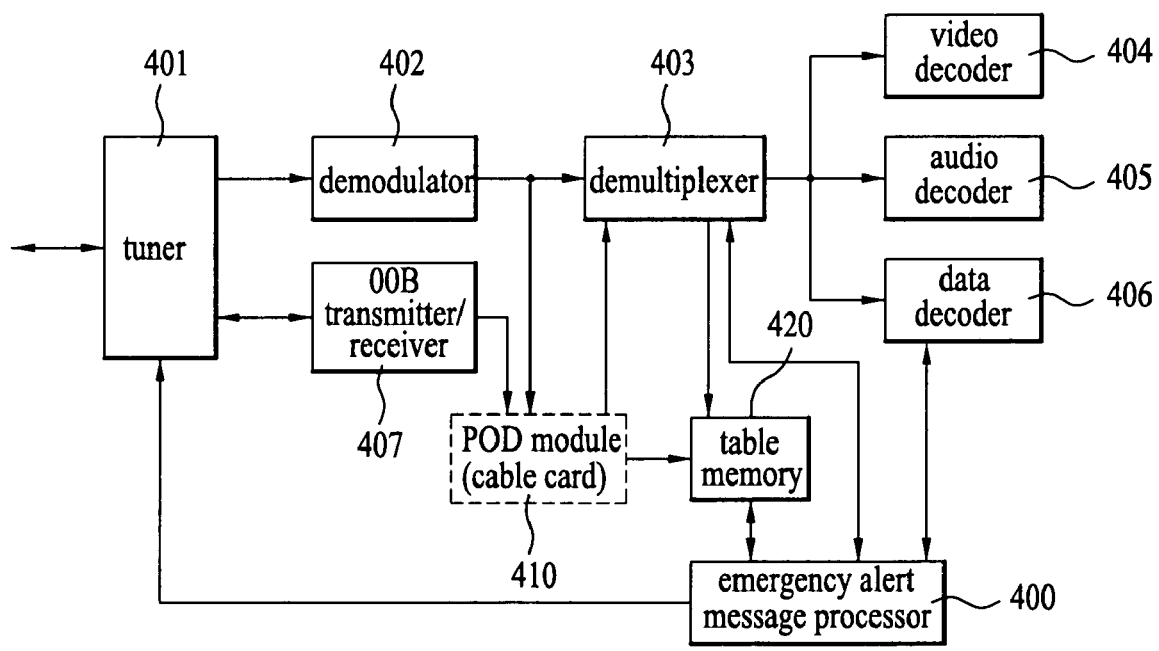
FIG. 4 is a block diagram showing an embodiment of a cable broadcast receiver according to the present invention.

FIG. 4 is a block diagram showing an embodiment of a cable broadcast receiver capable of receiving and signaling (or processing) an emergency alert message according to the present invention. In this drawing, the expression of a POD module 410 by a dotted line means that the POD module 410 can be removably inserted in a slot of the cable broadcast receiver, or host, by the user.

The host includes a tuner 401, a demodulator 402, a demultiplexer 403, a video decoder 404, an audio decoder 405, a data decoder 406, an OOB transmitter/receiver unit 407, a table memory 420, and an emergency alert message processor 400.

In the broadcast receiver of FIG. 4 with the aforementioned configuration, an A/V broadcast signal of a specific channel, received by in-band signaling, is tuned and demodulated through the tuner 401 and demodulator 402 and then outputted in the form of a transport stream.

At this time, the demodulated A/V broadcast signal is inputted to the POD module 410 if the POD module 410 has been inserted, and directly to the demultiplexer 403, otherwise.

If the POD module 410 has been inserted, an emergency alert message and channel and program guide information, tabled according to the SI protocol and transmitted by OOB signaling, are also inputted to the POD module 410 through the tuner 401 and OOB transmitter/receiver unit 407.

The POD module 410 is adapted to, if the A/V broadcast signal demodulated by the demodulator 402 is in a scrambled state, descramble that signal after subscriber identification, etc., and output the descrambled signal to the demultiplexer 403.

The POD module 410 also parses an SI table, and stores the parsed result in the table memory 420 and, at the same time, outputs the parsed result to the emergency alert message processor 400 if it represents an emergency alert message.

The A/V broadcast signal inputted to the demultiplexer 403 is a multiplexed signal which is in the form of a transport packet. Each packet has a header containing a Packet IDentifier (PID) which indicates whether the contents of the packet are in video stream form or in audio stream form. The PID provides means capable of demultiplexing the multiplexed signal. Namely, the demultiplexer 403 can identify from the PID whether the current packet is a video signal, audio signal or data signal. Accordingly, the demultiplexer 403 separates the inputted A/V broadcast signal into a video signal, an audio signal and a data signal with reference to the PID of each transport packet and outputs the separated video signal and audio signal to the video and audio decoders 404 and 405, respectively. The separated data signal is stored in the table memory 420, and, as needed, the stored data signal is decoded through the data decoder 406 and then displayed on the screen.

The video decoder 404 decodes a compression-coded video signal in the reverse of the coding to restore it to the original video signal, and the audio decoder 405 decodes a compression-coded audio signal in the reverse of the coding to restore it to the original audio signal. For example, the video decoder 404 may be an MPEG-2 decoder and the audio decoder 405 may be an AC-3 decoder.

On the other hand, in the case where the POD module 410 is not inserted in the host, it is necessary to parse an emergency alert message and channel and program guide information from data information, tabled according to the PSIP and transmitted by in-band signaling. At this time, the A/V broadcast signal and the data information may be multiplexed and transmitted by in-band signaling in the form of a transport packet. In this case, the demultiplexer 403 separates the transmitted transport packet into a video signal, an audio signal and a data signal. The emergency alert message, among the parsed table information, is outputted to the emergency alert message processor 400 at the same time as being stored in the table memory 420.

The emergency alert message processor 400 is adapted to process an emergency alert message received by OOB signaling if the POD module (or cable card) 410 has been inserted, and an emergency alert message received by in-band signaling if the POD module 410 is not inserted.

That is, if the value of a table_ID field parsed from the data information is 0xD8, the POD module 410 or the demultiplexer 403 regards the contents of the table as those of an emergency alert message and then outputs them to the emergency alert message processor 400.

The emergency alert message processor 400 processes the received emergency alert message with reference to the values of respective fields in the emergency alert message. For example, the emergency alert message processor 400 determines, on the basis of the value of an alert_priority field in the received emergency alert message, whether the emergency alert message will be disregarded unconditionally or only in a specific condition, or the receiver will be compulsorily tuned to an emergency broadcast channel, or details channel, contained in the emergency alert message.

Further, if emergency alert contents in text form are present in the received emergency alert message, the emergency alert message processor 400 scrolls the emergency alert contents on the screen at a scroll rate transmitted from a transmitter.

The process of extracting and displaying the emergency alert contents and scroll rate from the emergency alert message by the emergency alert message processor 400 is performed in the same manner as stated above, and a detailed description thereof will thus be omitted.

The terminology used herein includes terms defined taking into consideration functions implemented in the present invention, and the definition thereof may be changed in accordance with the intention of skilled persons in the technical field or the custom in the technical field. Accordingly, the definition of the terminology must be determined based on the whole content of the present invention.

As apparent from the above description, the present invention provides an emergency alert message data structure, an emergency alert message signaling method and a cable broadcasting system using the same, wherein a transmitter determines and transmits a scroll rate of scroll data and a receiver scrolls the scroll data, or emergency alert text, at the transmitted scroll rate, thereby enabling all receivers to scroll the same emergency alert contents (or text) at substantially the same scroll rate. Therefore, it is possible to solve the conventional problems resulting from the fact that the scroll rate of the scroll data may be different according to receiver manufacturers and the types of receivers from the same manufacturer. That is, the present invention has the effect of preventing the receiver from scrolling the emergency alert contents so fast that the viewer may not accurately recognize a state of emergency, and from scrolling the emergency alert contents so slowly that the viewer may feel irritated.

In addition, the receiver displays the total and remaining time information of the scroll data together with the scroll data when the emergency alert contents are scrolled. Therefore, the viewer can confirm the total or remaining scroll time of the emergency alert contents. In particular, when the emergency alert is released, but the emergency alert contents are continuously scrolled due to the remaining scroll data, the viewer can predict a scroll end time from the time information, thereby minimizing the viewer's inconvenience resulting from unnecessary information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for processing a cable broadcast signal including an emergency alert message and displaying text associated with the emergency alert message, the apparatus comprising:
   a signal receiving unit adapted to receive the cable broadcast signal including the emergency alert message, wherein the emergency alert message includes a duration field that represents a time during which the emergency alert message is available and emergency alert text data representing emergency alert text to be displayed, and wherein the emergency alert message includes scroll rate data representing a scroll rate of the emergency alert message and a length of the emergency alert text;
   a processor adapted to obtain an amount of time required to display the emergency alert text based on the scroll rate and length of the emergency alert text; and
   a display unit adapted to display, on a video screen, the amount of time required to display the emergency alert text while scrolling the emergency alert text across the video screen at the scroll rate provided in the emergency alert message,
   wherein the amount of time required to display the emergency alert text is an amount of time associated with a remaining amount of text to be scrolled across the video screen, or an amount of time associated with a total amount of text to be scrolled across the video screen.

2. The apparatus of claim 1, wherein the amount of time associated with the remaining amount of text is a time until characters of the emergency alert text are scrolled.

3. The apparatus of claim 1, wherein the display unit is further adapted to display the amount of time elapsed during the entire time period that it is scrolling the emergency alert text on the video screen.

4. An emergency alert signaling method for use by a broadcasting system, the method comprising:
   identifying an emergency alert message included in a broadcast signal, the emergency alert message comprising a duration field that represents a time during which the emergency alert message is available and emergency alert text data representing emergency alert text to be displayed, and a scroll rate field containing a scroll rate for the emergency alert text and an alert text length field representing a length of the emergency alert text;

obtaining an amount of time required to display the emergency alert text based on the scroll rate and the length of the emergency alert text; and displaying on a video screen the time required to display the emergency alert text while scrolling the emergency alert text across the video screen according to the scroll rate indicated in the scroll rate field, wherein the amount of time required to display the emergency alert text is an amount of time associated with a remaining amount of text to be scrolled across the video screen or an amount of time associated with a total amount of text to be scrolled across the video screen.

5. The method of claim 4, the amount of time associated with the remaining amount of text is a time until characters of the emergency alert text are scrolled.

6. The method of claim 4, wherein displaying the time on the video screen while scrolling the emergency alert text across the video screen comprises:

displaying the time elapsed during the entire time period that the emergency alert text is scrolling across the video.

* * * * *